United States Patent
Vittimberga et al.

(10) Patent No.: US 11,188,980 B1
(45) Date of Patent: Nov. 30, 2021

(54) DISPLAY AND CONTROL OF BUILDING PURCHASE CASH FLOW

(71) Applicant: Wells Fargo Bank, N.A., San Francisco, CA (US)

(72) Inventors: Paul Vittimberga, Charlotte, NC (US); Nikhilesh Banerjee, Berkeley, CA (US); Colby Eugene Thiele, Cave Creek, AZ (US); John T. Wright, Benicia, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 225 days.

(21) Appl. No.: 16/442,882

(22) Filed: Jun. 17, 2019

(51) Int. Cl.
  *G06Q 40/02* (2012.01)
  *G06T 11/20* (2006.01)
  *G06Q 50/16* (2012.01)

(52) U.S. Cl.
  CPC .......... *G06Q 40/02* (2013.01); *G06Q 50/167* (2013.01); *G06T 11/206* (2013.01)

(58) Field of Classification Search
  None
  See application file for complete search history.

(56) References Cited

U.S. PATENT DOCUMENTS

| | | | |
|---|---|---|---|
| 6,249,905 B1* | 6/2001 | Yoshida | G06F 8/24 715/744 |
| 7,797,213 B2 | 9/2010 | Kemper et al. | |
| 8,595,130 B2 | 11/2013 | Johnson et al. | |
| 2003/0182230 A1* | 9/2003 | Pessin | G06Q 40/025 705/39 |
| 2004/0073504 A1* | 4/2004 | Bryman | G06Q 40/02 705/36 R |
| 2006/0080615 A1* | 4/2006 | Myers | G06Q 30/00 715/764 |

(Continued)

FOREIGN PATENT DOCUMENTS

CN  108985724 A  * 12/2018  .......... G06Q 10/103

OTHER PUBLICATIONS

Keefer, "An Object Oriented Framework for Accounting Systems", https://web.archive.org/web/20100613060505/http://www.dsc.ufcg.edu.br:80/~jacques/cursos/map/recursos/accounts.pdf (Year: 1994).*

(Continued)

*Primary Examiner* — Gregory A Pollock
*Assistant Examiner* — Mark A Malkowski
(74) *Attorney, Agent, or Firm* — Merchant & Gould P.C.

(57) ABSTRACT

A method implemented on an electronic computing device for viewing and adjusting cash flows related to a building purchase includes receiving information regarding origination points and destination points for the cash flows. An icon is rendered on a display screen of the electronic computing device for each of the origination points and destination points. Connection lines are rendered between a plurality of the origination points and destination points. Each of the connection lines represents a cash flow between one of the origination points and one of the destination points. A change is detected in a connection of one of the connection lines to a different one of the origination points or to a different one of the destination points. As a result of the change in the connection, a cash flow between end points of the one of the connection lines is updated and displayed on the display screen.

15 Claims, 9 Drawing Sheets

(56) References Cited

U.S. PATENT DOCUMENTS

| | | | | |
|---|---|---|---|---|
| 2008/0189205 A1* | 8/2008 | McKernan | ............ | G06Q 40/123 |
| | | | | 705/39 |
| 2009/0048957 A1* | 2/2009 | Celano | .................. | G06Q 40/06 |
| | | | | 705/35 |
| 2010/0287092 A1* | 11/2010 | Colman | ............... | G06Q 40/025 |
| | | | | 705/38 |
| 2011/0161852 A1* | 6/2011 | Vainio | .................. | G06F 3/0488 |
| | | | | 715/769 |
| 2013/0339219 A1 | 12/2013 | Bernheimer et al. | | |
| 2017/0161826 A1 | 6/2017 | Packer et al. | | |
| 2017/0169511 A1 | 6/2017 | Kelly | | |
| 2017/0322918 A1* | 11/2017 | Watanabe | ............. | G06F 40/169 |

OTHER PUBLICATIONS

ConsumerFinance, "What is an escrow or impound account?", https://web.archive.org/web/20190505005245/https://www.consumerfinance.gov/ask-cfpb/what-is-an-escrow-or-impound-account-en-140/ (Year: 2017).*

Regions.Com, "How to Calculate Home Equity Line of Credit", https://web.archive.org/web/20150904011412/https://www.regions.com/Insights/Personal/Home-Equity-Calculators/how-to-calculate-home-equity-line-of-credit (Year: 2015).*

Meggitetal, "Reasons to Remove an Escrow Account", Zacks.com, https://finance.zacks.com/reasons-remove-escrow-account-2014.html, Mar. 6, 2019 (Year: 2019).*

* cited by examiner

US 11,188,980 B1

DISPLAY AND CONTROL OF BUILDING PURCHASE CASH FLOW

BACKGROUND

Purchasing a home, can be an exciting but also a daunting experience, particularly for first time homebuyers. Many homebuyers purchase as much home as they can afford and sometimes are not cognizant of all the costs that are associated with purchasing a home.

In addition to a cost of a mortgage, costs of purchasing a home can include property taxes, homeowner's insurance, private mortgage insurance, Federal Housing Administration (FHA) insurance, etc. Costs of a mortgage can vary depending on the amount of the mortgage loan, the interest rate of the mortgage, the term of the mortgage, the time interval for mortgage payments, and whether the mortgage is fixed interest or variable interest.

SUMMARY

Embodiments of the disclosure are directed to a method implemented on an electronic computing device for viewing and adjusting cash flows related to a building purchase, the method comprising: on the electronic computing device, receiving information regarding origination points and destination points for the cash flows; rendering an icon on a display screen of the electronic computing device for each of the origination points and destination points; rendering connection lines between a plurality of the origination points and destination points, each of the connection lines representing a cash flow between one of the origination points and one of the destination points; detecting a change in a connection of one of the connection lines to a different one of the origination points or to a different one of the destination points; and as a result of the change in the connection, updating and displaying on the display screen the cash flow between end points of the one of the connection lines, one of the end points being the different one of the origination points or the different one of the destination points.

In another aspect, a method implemented on an electronic computing device for rendering a graphical using interface (GUI) that depicts cash flows for a purchase of a home comprises: on the electronic computing device, receiving information relating to the purchase of the home; rendering, on the GUI, a plurality of icons, each icon representing an origination point or a destination point for at least a part of the cash flows; rendering connection lines between a plurality of the icons representing an origination point to a plurality of the icons representing a destination point; permitting the icons to be relocatable and removable on the GUI; rendering a summary of mortgage information on the GUI; detecting a modification of one or more of the cash flows on the GUI; and automatically updating the summary of mortgage information to incorporate changes to the summary of mortgage information as a result of the modification of the one or more cash flows.

In yet another aspect, an electronic computing device comprises: a processing unit; and system memory, the system memory including instructions which, when executed by the processing unit, cause the electronic computing device to: receive information regarding origination points and destination points for cash flows related to a purchase of a home, the purchase of the home including a mortgage; render an icon on a display screen of the electronic computing device for each of the origination points and destination points; render connection lines between a plurality of the origination points and destination points, each of the connection lines representing a cash flow between one of the origination points and one of the destination points; render, on the display screen, a summary of expenses relating to the purchase of the home; detect a selection of one of connection lines on the display screen; render, on the display screen, a control element pertaining to the connection line that is selected; receive, from the control element, an indication of an adjustment of a payment amount or a payment interval for the mortgage; as a result of the adjustment of the payment amount or the payment interval for the mortgage, receive an update to a payoff date for the mortgage; and update the summary of expenses to reflect the update of the payoff date for the mortgage.

The details of one or more techniques are set forth in the accompanying drawings and the description below. Other features, objects, and advantages of these techniques will be apparent from the description, drawings, and claims.

DETAILED DESCRIPTION

Figure 1:
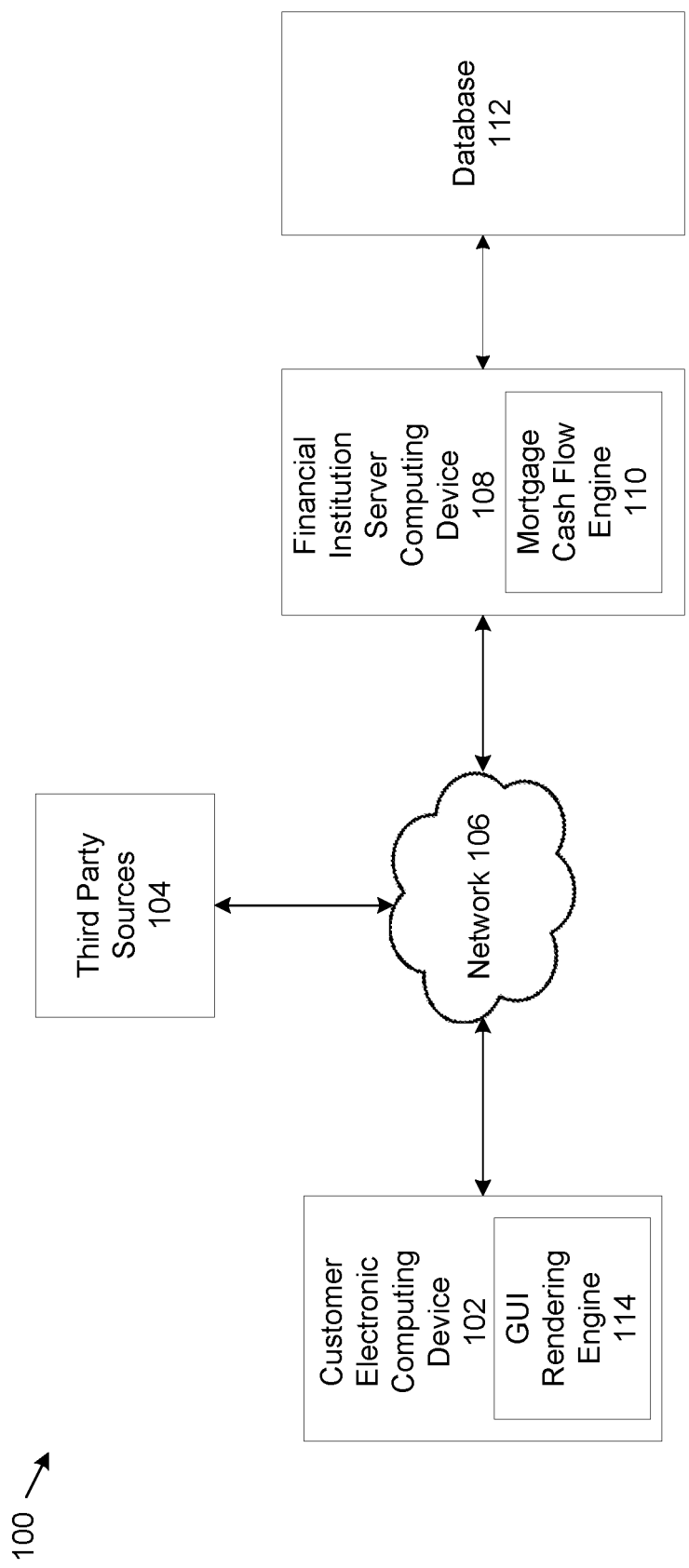
FIG. 1 shows an example system that supports a display and control of home purchase cash flows.

The present disclosure is directed to systems and methods for displaying building purchase cash flows to a customer of a financial institution and permitting the customer to make changes to the cash flows. In the present disclosure, the systems and methods are described for a purchase of a home. However, the systems and methods can also apply to other building purchases, such as commercial real estate.

Home purchase cash flows can include cash flows associated various aspects of the purchase and payment of a home, such as payments of a home mortgage, property taxes, homeowners insurance, private mortgage insurance, Federal Housing Administration (FHA) insurance, and homeowners association (HOA) costs. Other cash flows are possible.

Cash flows associated with a mortgage can include payments for principal and interest (P&I), property taxes, homeowner's insurance, and either private mortgage insurance (PMI) or FHA insurance when required. In a typical scenario, periodic payments for the P&I are made from a customer account directly to the financial institution that holds the mortgage. Also, in the typical scenario, periodic payments for the property taxes, homeowner's insurance, and either PMI or FHA payments, when necessary, are made from the customer account to an escrow account.

PMI payments are typically necessary when the customer takes out a conventional mortgage and the equity payment on the mortgage is of an insufficient percentage, typically less than 20 percent, of the value of the home. When the balance of the mortgage is paid down to a certain percentage, typically 78 percent of the home's original appraised value, the financial institution that holds the mortgage can eliminate the PMI requirement. FHA payments are needed when the mortgage is an FHA mortgage.

Payments can be made from the escrow account to a taxing authority when property taxes are due, payments can be made from the escrow account to the customer's homeowner's insurance policy when the homeowner's insurance is due, and payments can be made from the escrow account to either a private mortgage insurance company or to the FHA when the PMI or FHA payments are due. Other scenarios are possible.

HOA payments can be needed when the home is a townhouse, condominium or other building that can be managed by a resident's association. The resident's association can handle external maintenance for the townhome, condominium, or other lands/buildings. Customer payments to the escrow account and for HOA are typically made monthly, but can be bi-monthly, bi-weekly or some other periodic interval.

In example embodiments, one or more graphical user interfaces (GUIs) are provided on a computing device to allow the user to manage and manipulate the noted cash flows. The GUIs can include icons that can represent items such as a customer checking account, a customer savings account, an escrow account, P&I payment, property taxes, homeowner's insurance, PMI, FHA, and HOA. Other items are possible. The GUIs can include connection lines from one or more of the customer savings account, customer savings account, and escrow account to one or more of the P&I payment, property taxes, homeowner's insurance, PMI, FHA, and HOA. The connection lines can represent cash flow between items.

The GUIs can also include a summary of information regarding the mortgage and other expenses regarding the home purchase. For example, the GUIs can display an initial amount of the mortgage, a current interest rate of the mortgage, a periodic payment amount for the mortgage, typically a monthly payment amount, a current payment interval, for example monthly, bi-monthly, or bi-weekly, a time in years and months remaining in the mortgage, an annual property tax for the home, a payment amount for homeowner's insurance, and a periodic payment amount for HOA, typically a monthly amount. Other types of information are possible.

Once the cash flow is displayed on the GUIs, the systems and methods permit the customer to make changes to the cash flow by moving, adding or deleting icons and by moving, adding or deleting connection lines between icons. For example, when a determination is made that enough of the principal on the mortgage has been payed so that PMI is no longer needed, the customer can delete the icon for PMI. An another example, the customer can open a savings account, create an icon for a savings account, and save for and pay property taxes directly via the savings account, instead of via an escrow account. As another yet example, when an escrow account is used to pay the property taxes and the mortgage has been paid off, the customer can delete the icon for the escrow account and move connection lines for property taxes and homeowner's insurance from the escrow account to one or more of the checking account or the savings account. Other changes are possible. Source and destination point icons on the GUI can be identified and moved by dragging and dropping the icons to new positions on the GUI. Similarly, connection lines can be moved by dragging and dropping a beginning point or ending point on the connection lines.

When any changes made by the customer result in changes to home payment costs, the summary of payment information on the GUI can update to reflect the changes. For example, if PMI or FHA insurance is included in the escrow account, when PMI or FHA insurance is no longer needed, the periodic payment amount can be reduced accordingly, and the summary of payment information on the GUI can show the updated payment amount. As another example, if the customer changes his/her homeowner insurance company, for example to obtain a lower price for homeowner's insurance, the payment amount can be updated accordingly. In addition, the summary of payment information can be dynamically updated, for example each month, to show changes in interest rates, for an adjustable rate mortgage, and updates in years/months remaining on the mortgage.

The customer can also use the GUIs to make other changes, such as to increase or decrease periodic payment amounts, to change the periodic payment interval, for example from monthly to bi-weekly and to change the method of payment from a check to an ACH (automated clearing house) electronic payment. Other changes using the GUIs are possible.

The systems and methods discussed herein are directed to a computing technology that can display on a GUI of an electronic computing device icons representing cash flows for a home purchase and that permit a user to connect, add or delete icons to control and modify the cash flows. The systems and methods can automatically calculate changes to the cash flows based on the connections between icons and can display the changes to the cash flows to the user. The systems and methods can provide efficiencies in implementing adjustments to the cash flows for the home purchase by combining steps of receiving information regarding the cash flows and graphically displaying the changes to the cash flows to the user. In addition, communications between the user and the financial institution can be streamlined. Instead of communication via voice, email or text messaging between the user and the financial institution in an attempt to communicate cash flow changes, the user can simply make the changes using the GUI.

FIG. 1 shows an example system 100 that can support display and control of home purchase cash flows. System 100 includes a customer electronic computing device 102, third party sources 104, a network 106, a financial institution server computing device 108 and a database 112. Customer electronic computing device 102 includes a GUI rendering engine 114. Financial institution server computing device 108 includes a mortgage cash flow engine 110. More, fewer, or different components can be used.

The example customer electronic computing device 102 is an electronic computing device of the customer of the financial institution. The electronic computing device can be one or more of a desktop computer, a laptop computer, or a mobile computing device, such as a tablet computer or a smartphone. Other electronic computing devices are possible. Customer electronic computing device 102 can include global positioning system (GPS) software that can provide a current geolocation of customer electronic computing device 102. In this disclosure, customer electronic computing device 102 is referred to as the smartphone.

The example GUI rendering engine 114 comprises a software application on the smartphone. The software application uses the cash flow information from mortgage cash flow engine 110 to create a GUI for the cash flow than can be rendered on the smartphone. As explained in more detail later herein, the GUI can include icons that represent origination points and destination points for the cash flow. Example origination points and destination points can include checking and savings accounts, escrow accounts, local government entities for property tax payments, and insurance companies for homeowners insurance and PMI. Other origination points and destination points are possible, such as the FHA. In some implementations, GUI rendering engine 114 can automatically update the GUI to remove a PMI or other icon from the GUI.

The example third party sources 104 are entities that can provide information regarding the home purchase cash flow. Example third party sources 104 can include a taxing authority (typically state or local government) for property taxes, an insurance company for homeowner's insurance, an insurance company for PMI payments, and the FHA. In addition, for the case where the customer's personal bank is different from the financial institution from where the mortgage is obtained, the customer's personal bank can be a third party source. Other third party sources are possible.

The example network 106 is a computer network and can be any type of wireless network, wired network and cellular network, including the Internet. Customer electronic computing device 102 and third party sources 104 can communicate with financial institution server computing device 108 using network 106.

The example financial institution server computing device 108 is a server computer of a financial institution that currently holds a mortgage for a home purchased by the customer. In some implementations, the customer can also have one or more financial accounts, for example a checking account and a savings account, at the financial institution. The customer makes principal and interest (P&I) payments for the mortgage to the financial institution, and also typically makes other payments, such as property tax, homeowners' insurance, and PMI or FHA payments to an escrow account for the customer at the financial institution. The payments made to the escrow account are typically fractions of annual amounts that are paid periodically, typically monthly, when the P&I payments are made. For example, when P&I is payed monthly, one twelfth of the annual taxes, homeowner's insurance, and PMI or FHA payments are paid monthly to the escrow account.

The example mortgage cash flow engine 110 processes the P&I and other payments from the customer and identifies cash flows for these payments. For example, as discussed in more detail later herein, the mortgage cash flow engine 110 can identify cash flows from a checking account of the customer to the escrow account for property tax and homeowner's insurance payments, and from the checking account to a financial institution to make the P&I payments. As another example, mortgage cash flow engine 110 can also identify cash flows from the escrow account to a taxing authority, for example a local government entity, to pay property taxes for the customer and to a homeowner's insurance company to pay homeowner's insurance for the customer.

Mortgage cash flow engine 110 processes cash flow information to permit a GUI that displays the cash flow to be rendered on the customer's smartphone. Mortgage cash flow engine 110 also can detect customer changes on the GUI and adjust the cash flow accordingly. Mortgage cash flow engine 110 is described in more detail later herein.

The example database 112 is a database associated with the financial institution of financial institution server computing device 108. Database 112 can store mortgage related data for the customer, and when the customer has one or more financial accounts at the financial institution, database 112 can store information regarding the one or more financial accounts, as well as personal information regarding the customer. Database 112 can be distributed over a plurality of databases. Financial institution server computing device 108 can be programmed to query (e.g. using Structured Query Language, SQL) database 112 to obtain the mortgage related data.

An example schema including, but not limited to, customer information stored in database 112 is shown below. More, fewer, or different fields are possible.

Customer Name—the name of the customer;
Customer ID at financial institution—a set of letters, numbers, or other symbol that uniquely identifies the customer at a financial institution at which the customer has at least one financial account;
Mortgage initial amount—a number representing a monetary amount, typically in dollars, of an initial amount of the mortgage;
Interest rate—a current interest rate for the mortgage;
Payment amount—a periodic, typically monthly, payment amount for the mortgage, typically comprising principal and interest and an escrow amount;
Payment interval—a frequency at which the periodic payment amount is made;
Mortgage remaining amount—a number representing a monetary amount, typically in dollars, of an amount of principal remaining for the mortgage;
Years/Months remaining—numbers representing a number of years and months remaining on the mortgage;
Property tax—a current annual property tax for the home;
Homeowner's insurance—a current annual monetary amount of property and liability insurance for the home;
Homeowner's association dues—a periodic, typically monthly, monetary amount of homeowner's association dues;
PMI—a number representing an annual amount of private mortgage insurance for the home;
FHA—a number representing an annual amount of Federal Housing Association insurance for the home;

The above schema permits the database to be queried for data such data as the annual property tax for the home.

As an example, the following messaging format can be used between the financial institution server computing device 108 and the database 112 to obtain the annual property tax for the home.

| Customer ID | Property tax |
| --- | --- |

As an example, the database 112 can use the following messaging format in responding to such a request. In this example, the annual property tax for the home is returned in response to the request.

| Customer ID | Annual property tax amount |
| --- | --- |

Figure 2:
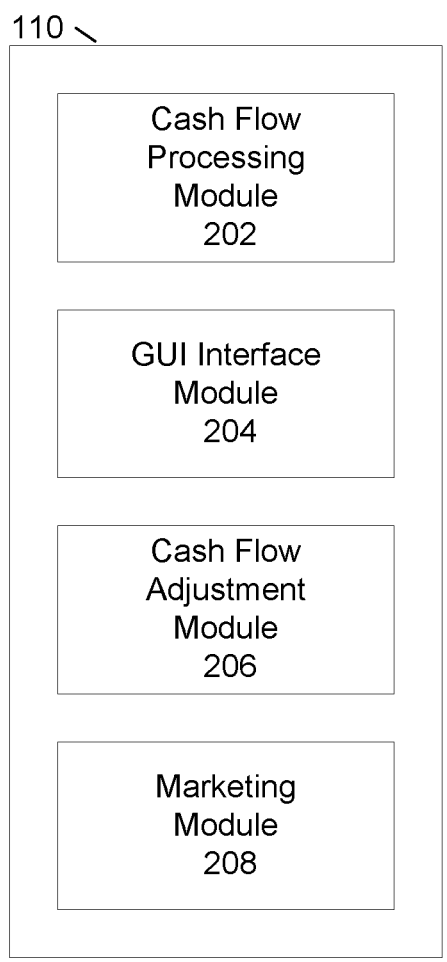
FIG. 2 shows example modules of a mortgage cash flow engine of the system of FIG. 1.

FIG. 2 show example modules of mortgage cash flow engine 110. Mortgage cash flow engine 110 includes a cash flow processing module 202, a GUI interface module 204, a cash flow adjustment module 206, and a marketing module 208. More, fewer, or different modules are possible.

The example cash flow processing module 202 processes home purchase information received from the customer and from third party sources 104 and determines a cash flow for the customer regarding payment of home purchase expenses. The cash flow for the payment of the home purchases expenses can include cash flow for payments of the P&I, escrow account, taxes, homeowner's insurance, PMI or FHA, and HOA expenses, when required.

The example GUI interface module 204 can process changes made by the customer on the GUI, and can also provide notifications and other updates related to the GUI to the smartphone. For example if, as discussed later herein, the customer increases a periodic mortgage payment or changes the interval of the periodic payment, for example from monthly to bi-weekly, the GUI can receive and process the changes. As another example, when the financial institution determines that the customer is no longer required to pay PMI, because the mortgage has been paid down to 78% of the home's appraised value, GUI interface module 204 can send a notification to the smartphone that PMI is no longer required.

The example cash flow adjustment module 206 adjusts the cash flows for the home purchase expenses based on customer changes to the GUI or based on cash flow changes identified by the cash flow processing module 202. For example, when a determination is made that the PMI is no longer necessary, or when the mortgage has been paid off so that an escrow account is no longer necessary, cash flow adjustment module 206 can recalculate necessary cash flows and send updated cash flow information to GUI interface module 204 so that corresponding changes can be made on the GUI.

The example marketing module 208 can permit the financial institution to make marketing overtures to the customer. For example, based on an evaluation of the customer's cash flows, the financial institution can suggest that the customer open a savings account at the financial institution, for example to save money for paying property taxes in lieu of an escrow account. As another example, when the mortgage has been paid down a sufficient amount so that the customer has built up a sufficient amount of equity in the home, the financial institution can suggest that the customer apply for a home equity line of credit. In this way the financial institution can enhance a relationship with the customer while also processing the customer's mortgage.

Figure 3:
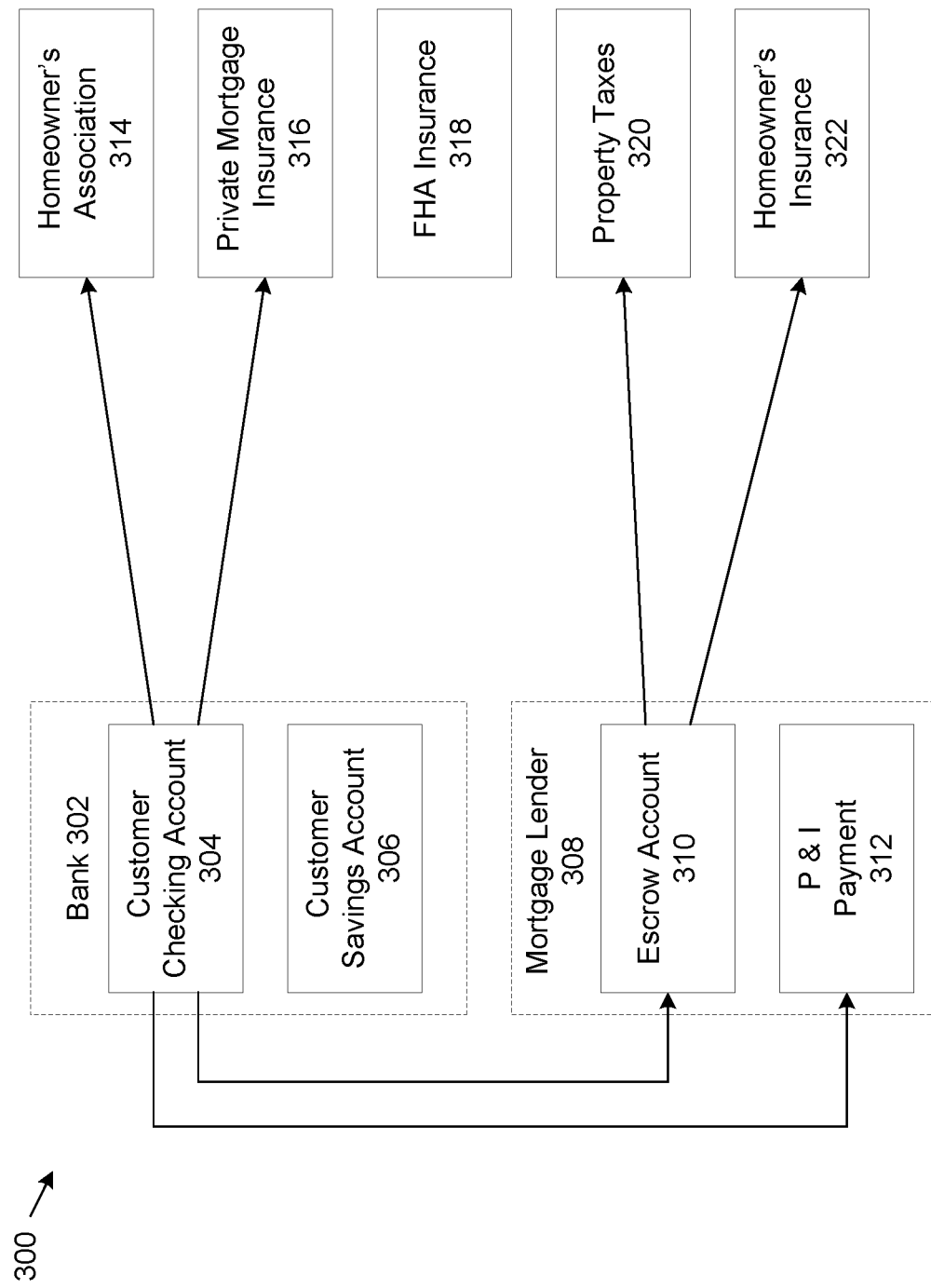
FIG. 3 shows a schematic diagram of example cash flows for payments for home purchase expenses.

FIG. 3 shows a schematic diagram 300 of example cash flows for payments for home purchase expenses. The example schematic diagram 300 includes a bank 302, a mortgage lender 308 and destination points for the payments such as a homeowner's association 314, private mortgage insurance 316, FHA insurance 318, property taxes 320 and homeowner's insurance 322. The customer has a customer checking account 304 and a customer savings account 306 at the bank 302. The mortgage lender 308 maintains an escrow account 310 and process a P&I payment 312. In some implementations, the bank 302 and the mortgage lender 308 are the same entity. Schematic diagram 300 shows functionality of example cash flows. Example GUIs that implement this functionality are discussed later herein, with respect to FIGS. 4-7.

The cash flow shown in FIG. 3 is for a townhouse or condominium that has a homeowner's association. The customer has a conventional mortgage that requires PMI insurance.

Schematic diagram 300 shows that payments are made from customer checking account 304 to escrow account 310 and for P&I payment 312. Payments are also directly made from customer checking account 304 to homeowner's association 314 to pay periodic, typically monthly, HOA fees. Payments are also made from customer checking account 304 to private mortgage insurance 316. Because the customer has a conventional loan and not a FHA loan, FHA insurance 318 is not used.

The example of FIG. 3 also shows that payments are made from escrow account 310 to pay property taxes 320 and to pay homeowner's insurance 322. The payments to pay property taxes 320 are typically made to a local government entity. The payments to pay homeowner's insurance are typically made to an insurance company.

Figure 4:
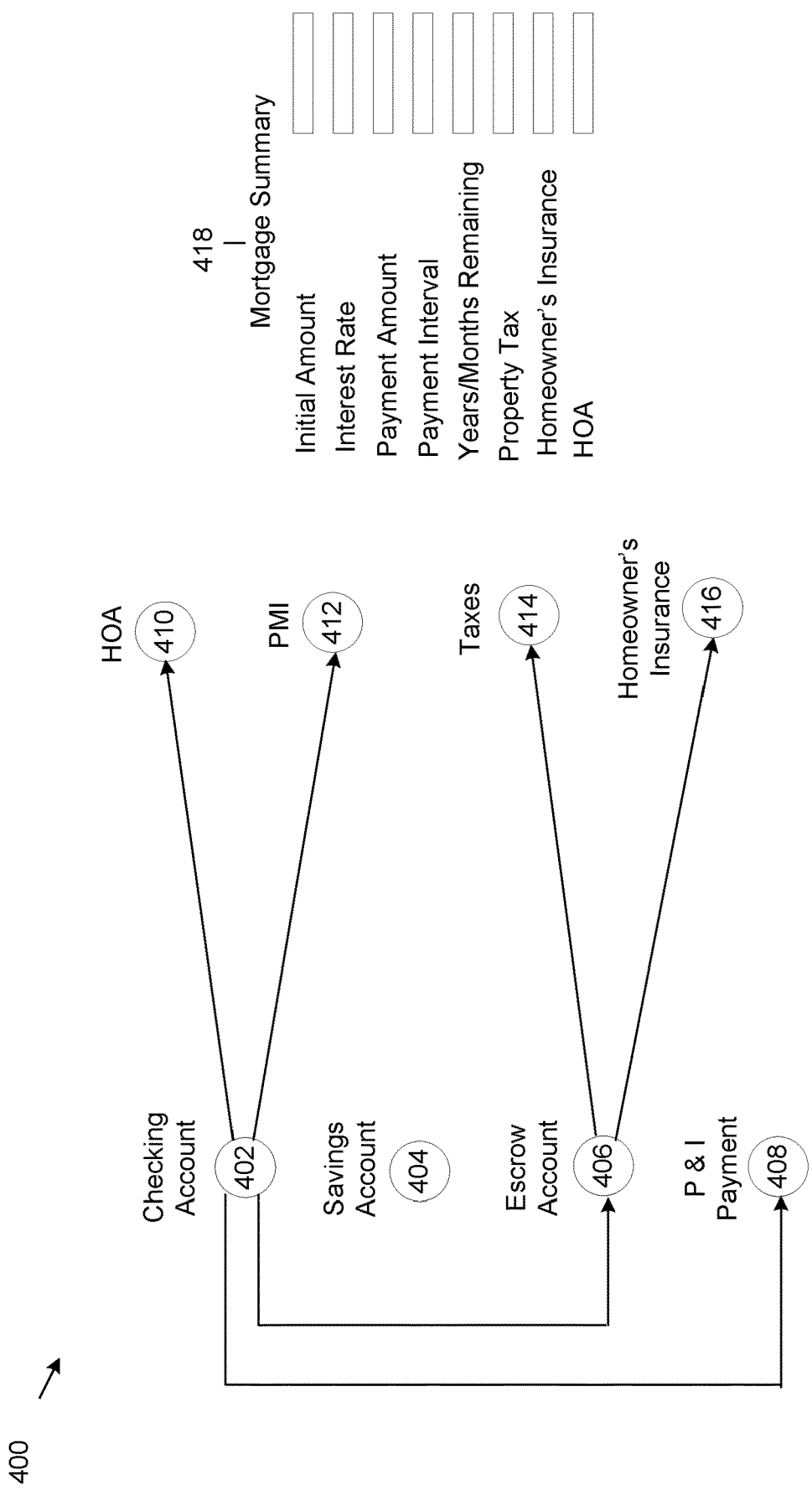
FIG. 4 shows an example graphical user interface that can be used with the system of FIG. 1.

FIG. 4 shows an example GUI 400 that can be rendered on the customer's smartphone. GUI 400 implements the functionality shown on schematic diagram 300. GUI 400 includes icons for a checking account 402, a savings account 404, an escrow account 406, a P&I payment 408, HOA 410, PMI 412, taxes 414 and homeowner's insurance 416. GUI 400 also includes a mortgage summary 418.

GUI 400 also shows connection lines that connect the icons. The connection lines represent cash flows. For example, a connection line from checking account 402 icon to P&I payment 408 represents a monthly payment to the lender of the mortgage of principal and interest. A connection line from checking account 402 icon to escrow account 406 icon represents a monthly payment from checking account 402 to pay a required monthly escrow amount. Monthly payments accumulate in escrow account 406 to permit property taxes and homeowner's insurance to be made when required. Typically property taxes are paid twice a year and typically homeowner's insurance is paid once a year. A connection line from escrow account 406 represents a payment of property taxes, and a connection line from escrow account 406 to homeowner's insurance 416 represents a payment of homeowner's insurance.

The example mortgage summary 418 displays current information regarding the customer's mortgage. This information can be dynamically updated when changes are made to the cash flow, so that the customer can see the effects of the changes. Mortgage summary 418 includes a display of an initial amount of the mortgage, a current interest rate for the mortgage, a periodic payment amount, a payment interval, years/months remaining for the mortgage, annual property tax, annual homeowner's insurance, and an HOA amount. More, fewer or different items can be included.

Figure 5:
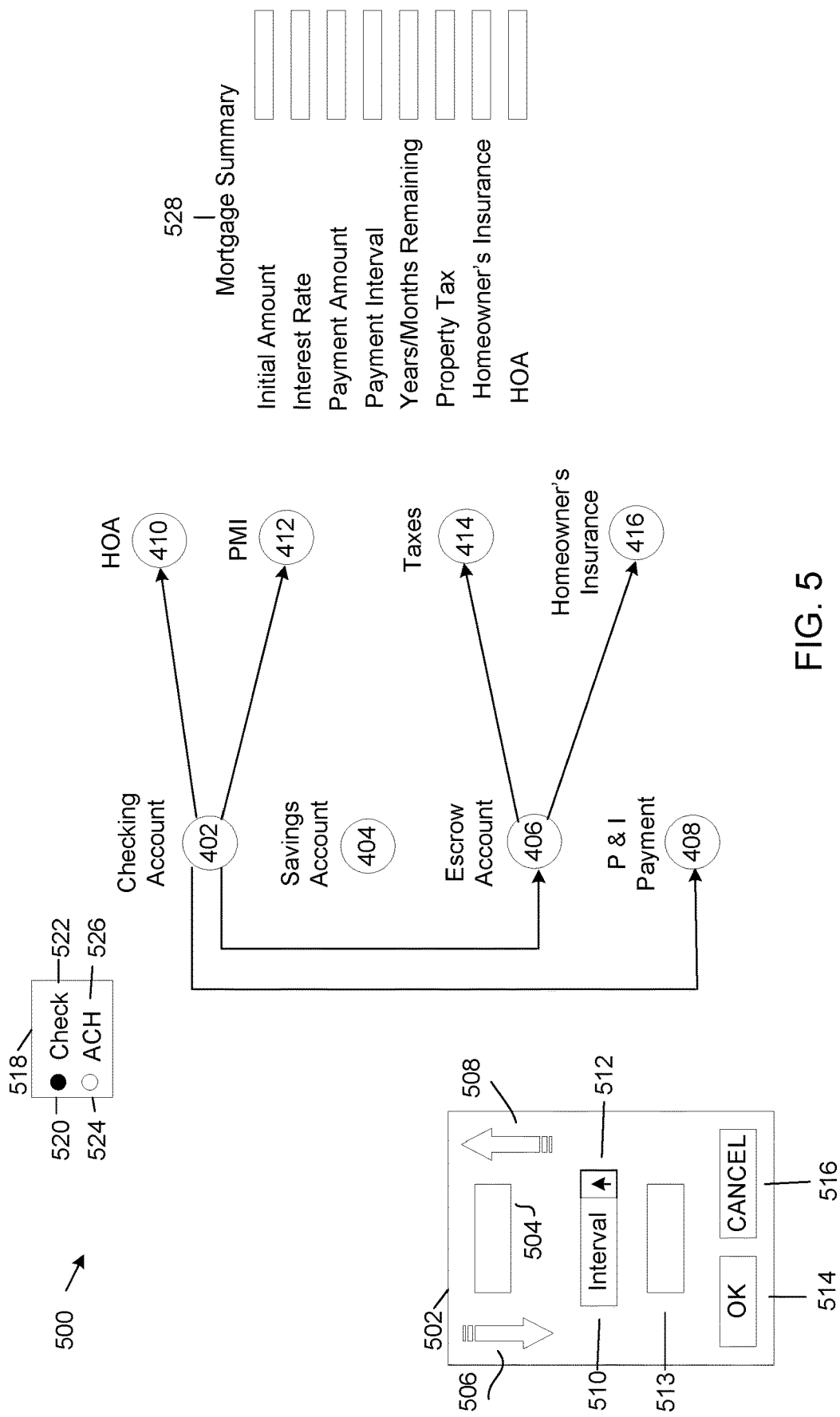
FIG. 5 shows another example graphical user interface that can be used with the system of FIG. 1.

FIG. 5 shows another example GUI 500 that can be rendered on the customer's smartphone. GUI 500 provides examples of modifications that can be made to parameters associated with the cash flow. In one example, when the customer highlights or selects checking account 402 icon, a control element 518 can be displayed that permits a selection of a method of payment from checking account 402. The method of payment can be via a check 522 or via an ACH (automated clearing house) 526 electronic payment from checking account 402. The selection can be made via example radio button 520 for check 522 or example radio button 524 for ACH 526.

In a second example using GUI 500, the customer can use example control element 502 to increase or decrease periodic mortgage payments, to change the periodic payment interval or to experiment with changing the time remaining to pay off the mortgage. Control element 502 includes a text box 504 in which a current periodic mortgage payment can be displayed, an upward arrow 508 via which the periodic mortgage payment can be increased, a downward arrow 506 in which the periodic mortgage payment can be decreased, a list box display 510, a list box pull-down arrow 512, a months remaining 513 button, an OK 514 button to submit any changes made, and a Cancel 516 button to exit control element 502 without making any changes. The list box pull-down arrow 512 can display available payment interval choices, comprising monthly, bi-monthly (twice a month), and bi-weekly (every other week). Increases or decreases to periodic mortgage payments are only accepted if they are within acceptable parameters for the mortgage.

The months remaining 513 button can permit the customer to experiment with adjusting the months remaining for the mortgage. For example, the customer can decide to pay off the mortgage in 5 years (60 months). When the customer enters 60 into the months remaining button 512, the periodic payment amount on mortgage summary 528 can show an amount of a periodic payment that would be necessary for the customer to pay the mortgage off in 60 months. The customer can then decide whether to accept the new periodic payment, or experiment with additional adjustments in the months remaining for the mortgage. Other example modifications using GUI 500 are possible.

Any changes made using GUI 500 to the periodic mortgage payment and to the payment interval can be reflected in the mortgage summary 528. For example, if the customer changes the payment interval from monthly to bi-weekly, a revised periodic mortgage payment can be equal to half of the previous monthly payment amount, but because 26 half-payments would be made during the year, there would be one more additional payment during the year than if monthly payments were made. The one additional payment during the year would be result in the mortgage being paid off faster with bi-weekly payments than for monthly payments. The mortgage would similarly be paid off faster if the periodic mortgage payment amount were increased. The mortgage summary 528 can show a change in the payment amount, the payment interval and the years/months remaining. In some implementations, mortgage summary 528 can be updated before the changes are submitted, so that the customer can view an effect of any changes before they are submitted.

Figure 6:
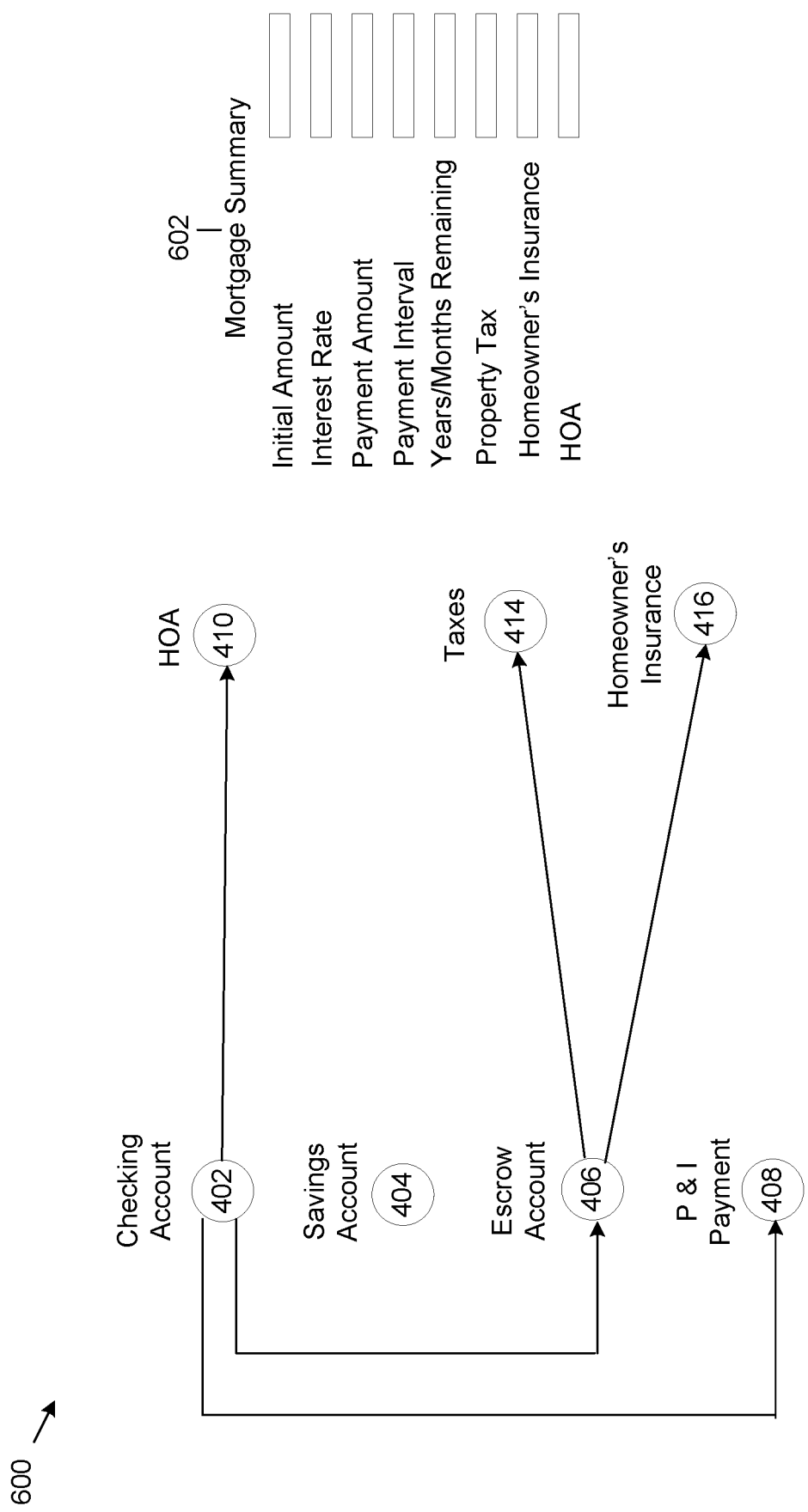
FIG. 6 shows yet another example graphical user interface that can be used with the system of FIG. 1.

FIG. 6 shows another example GUI 600, which can show an effect of the mortgage cash flow when the PMI is removed. As discussed earlier herein, PMI can be removed from the cash flow when the balance of the mortgage is paid down to a certain percentage, typically 78 percent of the home's original appraised value. For the example shown in FIG. 6, mortgage cash flow engine 110 determines that the PMI is no longer required and sends a notification to that effect to customer electronic computing device 102. When the notification is received, GUI rendering engine 114 removes PMI 412 icon and the connection line from PMI 412 icon to checking account 402 from GUI 600. The customer can then adjust the position of HOA 410 410, if desired. Mortgage summary 602 is updated to show any changes, for example to the payment amount, as result of the PMI being removed.

Figure 7:
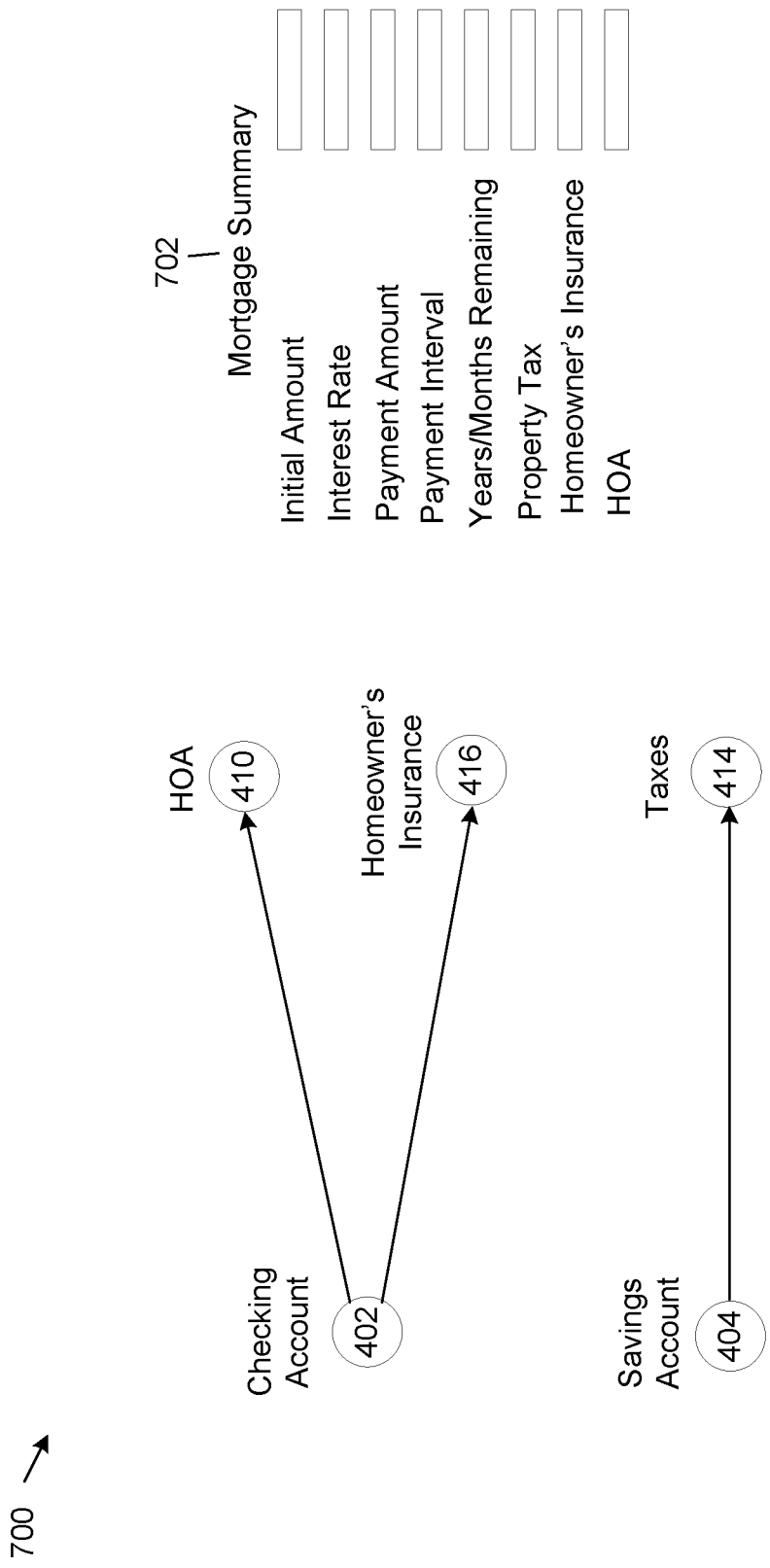
FIG. 7 shows yet another example graphical user interface that can be used with the system of FIG. 1.

FIG. 7 shows another example GUI 700, which shows changes to the cash flow when the mortgage is paid off. When the mortgage is paid off, the escrow account 406 icon and the P&I payment 408 icon are removed from GUI 700. In addition, the connection lines from escrow account 406 icon to taxes 414 icon and to homeowner's insurance 416 icon are removed from GUI 700. These changes can be made automatically by GUI rendering engine 114 when mortgage cash flow engine 110 sends a notification to customer electronic computing device 102 that the mortgage has been paid off.

Even though the mortgage has been paid off, payments still need to be made for property taxes, homeowner's insurance, and HOA. The customer can determine whether the payments will originate from the customer's checking account, savings account, or a combination of the two. The customer can move icons and move or add connection lines between icons, for example by dragging and dropping the icons or dragging and dropping the beginning or end of the connection lines, accordingly to reflect a new cash flow. As shown in FIG. 7, the customer has decided that homeowner's insurance is to be paid from the customer's checking account and property taxes are to be paid from the customer's savings account. Therefore, as shown in FIG. 7, the customer adds a connection line from checking account 402 icon to homeowner's insurance 416 icon and from savings account 404 icon to taxes 414 icon. Mortgage summary 702 can be updated to reflect any changes made.

Figure 8:
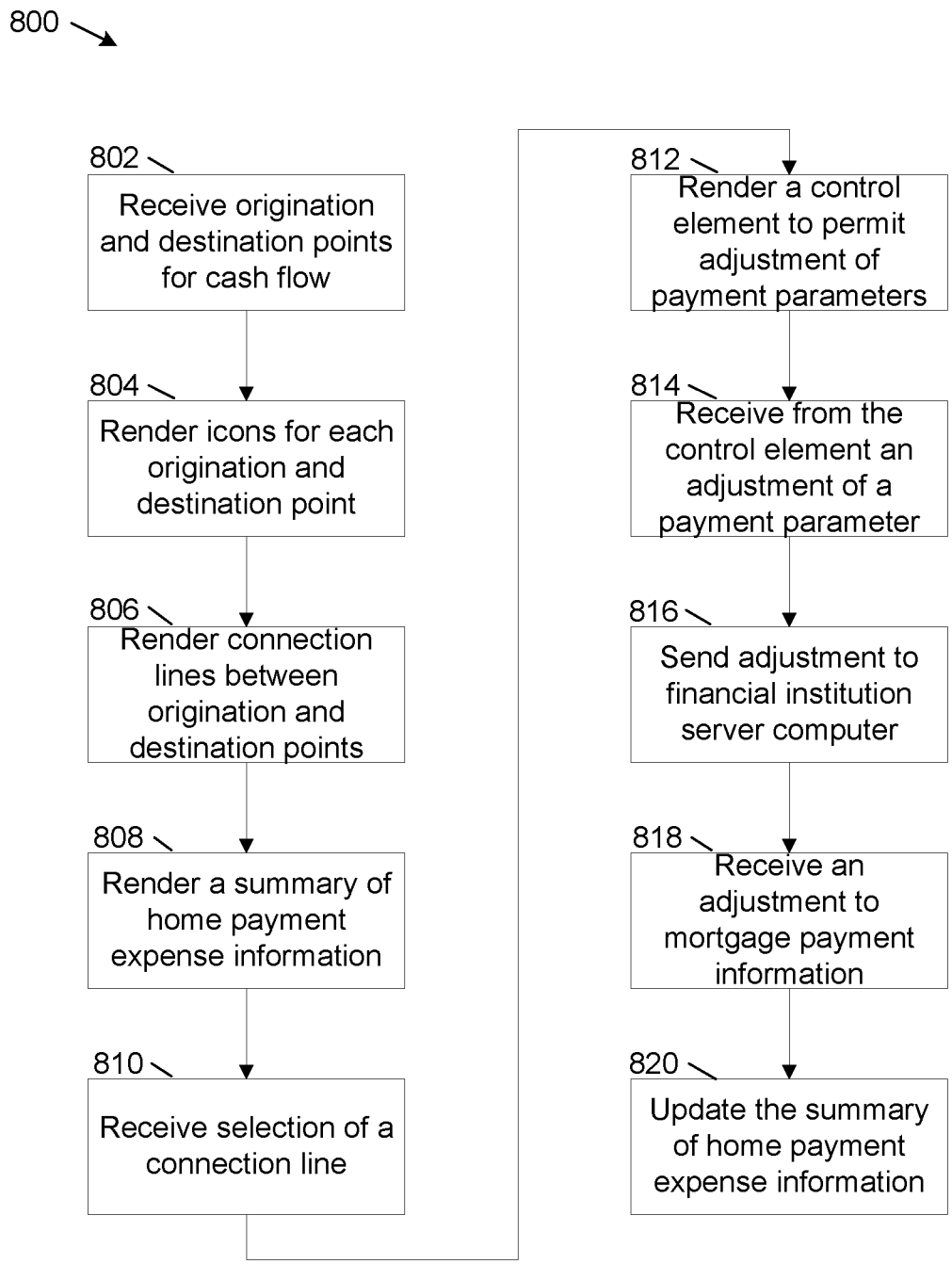
FIG. 8 shows an example method for controlling home payment cash flows.

FIG. 8 shows a flowchart for an example method 800 for controlling home payment cash flows. Method 800 is from the perspective of customer electronic computing device 102.

At operation 802, origination and destination points for cash flow are received at customer electronic computing device 102 from financial institution server computing device 108. The origination points and destination points can be determined from information that is known about the mortgage by the financial institution associated with financial institution server computing device 108. In the example implementation of method 800, the financial institution has knowledge of the details of the mortgage, such as principal and interest payments, interest rate, property taxes, homeowner's insurance, whether PMI or FHA insurance is needed, and whether there is a homeowners association that requires payments.

At operation 804, GUI rendering engine 114 renders icons on a display screen of customer electronic computing device 102. Icons are rendered for each of the origination and destination points received at operation 802.

At operation 806, connection lines are rendered between the origination and destination points, based on information about the mortgage received at operation 802. For example, if the information regarding the mortgage indicates that P&I payments are made from a customer checking account to an escrow account, a connection line can be rendered between an icon representing a customer checking account origination point and an icon representing a P&I destination point.

At operation 808, GUI rendering engine 114 renders a summary of home payment information on the display screen of customer electronic computing device 102. The summary of home payment information can include such items as an initial amount of the mortgage, an interest rate for the mortgage, a periodic payment amount, a payment interval, a number of years/months remaining on the mortgage, an information regarding property taxes, homeowner's insurance and HOA. Other or different information is possible.

At operation 810, a selection is received of a connection line between icons. For example, a selection can be received for the connection line between the customer's checking account and the P&I payment.

At operation 812, a control element is rendered to permit adjustment of payment parameters. For example, for the selection of the connection line between the customer's checking account and the P&I payment, a control element similar to item 502 in FIG. 5 can be rendered. This control element can be used to adjust the P&I payment amount and the interval in which the P&I payment amounts are made.

At operation 814, an adjustment of a payment parameter is received from the control element. For example, the adjustment can be to increase the P&I payment amount by $10 per pay period.

At operation 816, the adjustment of the payment parameter is sent to financial institution server computing device 108. Mortgage cash flow engine 110 then recalculates the number of years/months left on the mortgage, based on the increase in the P&I payment amount.

At operation 818, customer electronic computing device 102 receives, from financial institution server computing device 108, an adjustment to the mortgage payment information. In this case, the adjustment comprises an updated number of years/months left on the mortgage.

At operation 820, GUI rendering engine 114 renders on the display screen of customer electronic computing device 102 the updated number of years/months left on the mortgage.

Figure 9:
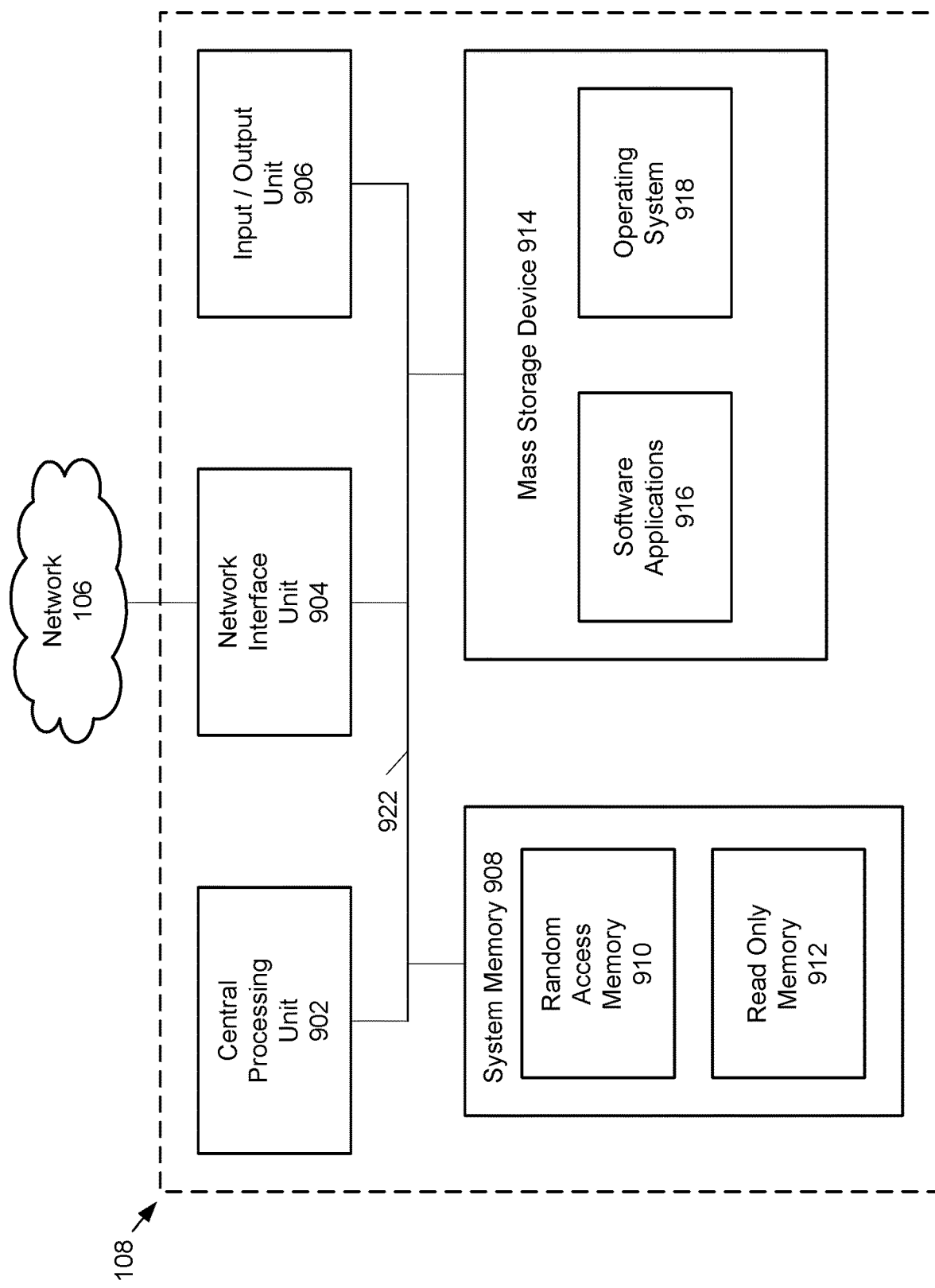
FIG. 9 shows example physical components of a financial institution server computing device of the system of FIG. 1.

As illustrated in the example of FIG. 9, financial institution server computing device 108 includes at least one central processing unit ("CPU") 902, also referred to as a processor, a system memory 908, and a system bus 922 that couples the system memory 908 to the CPU 902. The system memory 908 includes a random access memory ("RAM") 910 and a read-only memory ("ROM") 912. A basic input/output system that contains the basic routines that help to transfer information between elements within the financial institution server computing device 108, such as during startup, is stored in the ROM 912. The financial institution server computing device 108 further includes a mass storage device 914. The mass storage device 914 is able to store software instructions and data. Some or all of the components of the financial institution server computing device 108 can also be included in customer electronic computing device 102 and/or one or more computing devices associated with third party sources 104.

The mass storage device 914 is connected to the CPU 902 through a mass storage controller (not shown) connected to the system bus 922. The mass storage device 914 and its associated computer-readable data storage media provide non-volatile, non-transitory storage for the financial institution server computing device 108. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the financial institution server computing device 108.

According to various embodiments of the invention, the financial institution server computing device 108 may operate in a networked environment using logical connections to remote network devices through the network 106, such as a wireless network, the Internet, or another type of network. The financial institution server computing device 108 may connect to the network 106 through a network interface unit 904 connected to the system bus 922. It should be appreciated that the network interface unit 904 may also be utilized to connect to other types of networks and remote computing systems. The financial institution server computing device 108 also includes an input/output controller 906 for receiving and processing input from a number of other devices, including a touch user interface display screen, or another type of input device. Similarly, the input/output controller 906 may provide output to a touch user interface display screen or other type of output device.

As mentioned briefly above, the mass storage device 914 and the RAM 910 of the financial institution server computing device 108 can store software instructions and data. The software instructions include an operating system 918 suitable for controlling the operation of the financial institution server computing device 108. The mass storage device 914 and/or the RAM 910 also store software instructions and software applications 916, that when executed by the CPU 902, cause the financial institution server computing device 108 to provide the functionality of the financial institution server computing device 108 discussed in this document. For example, the mass storage device 914 and/or the RAM 910 can store software instructions that, when executed by the CPU 902, cause the financial institution server computing device 108 to display received data on the display screen of the financial institution server computing device 108.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on an electronic computing device for viewing and adjusting cash flows related to a building purchase, the method comprising:
   on the electronic computing device, receiving information regarding origination points and destination points for the cash flows;
   rendering an icon on a display screen of the electronic computing device for each of the origination points and destination points;
   rendering connection lines between a plurality of the origination points and destination points, each of the connection lines representing a cash flow between one of the origination points and one of the destination points;
   detecting a change in a connection of one of the connection lines to a different one of the origination points or to a different one of the destination points;
   as a result of the change in the connection, updating on the display screen the cash flow between end points of the one of the connection lines, one of the end points being the different one of the origination points or the different one of the destination points;
   receiving a notification that a mortgage for the building purchase has been paid in full;
   automatically removing from the display screen an icon corresponding to a principal and interest payment for the mortgage;
   automatically removing from the display screen an icon corresponding to an escrow account;

automatically removing connection lines to the icons corresponding to the principal and interest payment for the mortgage and the escrow account; and after the icon corresponding to the escrow account is removed from the display screen, adding a connection line from an icon representing a checking account or a savings account to an icon representing a taxing authority.

2. The method of claim 1, further comprising:

detecting a selection of one of the origination points or destination points; and rendering summary information regarding the one of the origination points or destination points that is selected.

3. The method of claim 1, wherein the origination points include the checking or the savings account and the escrow account.

4. The method of claim 1, wherein the destination points include a taxing entity and an organization for homeowner's insurance.

5. The method of claim 1, wherein the building purchase is a home, and further comprising rendering a summary of expenses relating to the building purchase, the summary including payment information regarding the mortgage for the building purchase.

6. The method of claim 5, wherein, when the cash flow is updated as a result of the change in the connection, further updating the summary of expenses to incorporate any changes to the summary of expenses as a result of the cash flow being updated.

7. The method of claim 1, further comprising:

detecting a deletion of an icon corresponding to one of the origination points or one of the destination points;

detecting a deletion of a connection line to the one of the origination points or the one of the destination points that is deleted; and as a result of the deletion of the icon and the connection line; updating one or more of the cash flows related to the building purchase.

8. The method of claim 1, wherein a destination point comprises a private mortgage insurance (PMI) payment, and further comprising:

receiving a notification that the PMI payment is no longer required; and automatically removing from the display screen one of the icons corresponding to the PMI payment.

9. A method implemented on an electronic computing device for viewing and adjusting cash flows related to a building purchase, the method comprising:

on the electronic computing device, receiving information regarding origination points and destination points for the cash flows;

rendering an icon on a display screen of the electronic computing device for each of the origination points and destination points;

rendering connection lines between a plurality of the origination points and destination points, each of the connection lines representing a cash flow between one of the origination points and one of the destination points;

detecting a change in a connection of one of the connection lines to a different one of the origination points or to a different one of the destination points;

as a result of the change in the connection, updating on the display screen the cash flow between end points of the one of the connection lines, one of the end points being the different one of the origination points or the different one of the destination points;

receiving a notification that a mortgage for the building purchase has been paid in full;

automatically removing from the display screen an icon corresponding to a principal and interest payment for the mortgage;

automatically removing from the display screen an icon corresponding to an escrow account;

automatically removing connection lines to the icons corresponding to the principal and interest payment for the mortgage and the escrow account; and after the icon corresponding to the escrow account is removed from the display screen, adding a connection line from an icon representing a checking account or a savings account to an icon representing an insurance company.

10. The method of claim 9, further comprising:

detecting an addition or deletion of one or more icons or connection lines on the display screen; and as a result of the addition or deletion of the one or more icons or connection lines on the display screen, updating a display of building purchase expense information on the display screen.

11. The method of claim 9, further comprising:

detecting a selection of the one of the connection lines on the display screen; and rendering a control element on the display screen associated with the one of the connection lines that is selected, the control element permitting an adjustment of periodic payments related to the building purchase.

12. The method of claim 9, further comprising:

detecting a selection of a connection line between one of the icons representing an origination point and the one of the icons that represents the payment of the principal and interest for the mortgage of the building purchase; and when the selection is detected, activating a control element that permits an adjustment of an amount or a frequency of the payment of the principal and interest.

13. The method of claim 12, further comprising:

receiving, from the control element, a selection or an entry of an increase or a decrease in the amount of the payment of the principal and interest; and updating the summary of mortgage information to reflect the increase or decrease in the amount of the payment of the principal and interest.

14. The method of claim 13, wherein the updating of the summary of mortgage information includes a change in a payoff date of the mortgage as a result of the increase or decrease in the amount of the payment of the principal and interest.

15. The method of claim 12, further comprising:

receiving, from the control element, a change in the frequency of the payment of the principal and interest; and updating the summary of mortgage information to reflect the change in the frequency of the payment of the principal and interest.

* * * * *